US008675088B2

(12) United States Patent
Matsubayashi

(10) Patent No.: US 8,675,088 B2
(45) Date of Patent: Mar. 18, 2014

(54) IMAGE COMPENSATION APPARATUS

(75) Inventor: Kei Matsubayashi, Barcelona (ES)

(73) Assignee: Sony Espana SA, Barcelona (ES)

(*) Notice: Subject to any disclaimer, the term of this patent is extended or adjusted under 35 U.S.C. 154(b) by 1157 days.

(21) Appl. No.: 12/619,128

(22) Filed: Nov. 16, 2009

(65) Prior Publication Data

US 2010/0182446 A1 Jul. 22, 2010

(30) Foreign Application Priority Data

Jan. 19, 2009 (GB) .................................. 0900867.3

(51) Int. Cl.
*H04N 5/228* (2006.01)
*H04N 5/222* (2006.01)
*G09G 5/00* (2006.01)

(52) U.S. Cl.
USPC ................... 348/222.1; 348/370; 348/333.02; 345/690

(58) Field of Classification Search
USPC ........... 348/222.1, 370, 371, 333, 362, 227.1, 348/216.1; 345/83, 690, 89
See application file for complete search history.

(56) References Cited

U.S. PATENT DOCUMENTS

| 7,663,691 | B2* | 2/2010 | Ciudad et al. ................. 348/371 |
| 2003/0122810 | A1* | 7/2003 | Tsirkel et al. ................. 345/207 |
| 2005/0041139 | A1* | 2/2005 | Lowles ........................ 348/362 |
| 2006/0022917 | A1* | 2/2006 | Kim .............................. 345/83 |
| 2009/0066857 | A1 | 3/2009 | Camp, Jr. |
| 2010/0053366 | A1* | 3/2010 | Mizuno et al. ............. 348/223.1 |
| 2010/0194961 | A1* | 8/2010 | Patel ........................ 348/333.01 |

FOREIGN PATENT DOCUMENTS

| JP | 6-334996 | 12/1994 |
| JP | 06334996 A | * 12/1994 ............... H04N 7/14 |
| JP | 7-298233 | 11/1995 |
| JP | 2000-101983 | 4/2000 |

* cited by examiner

*Primary Examiner* — Tuan Ho
*Assistant Examiner* — Marly Camargo
(74) *Attorney, Agent, or Firm* — Oblon, Spivak, McClelland, Maier & Neustadt, L.L.P.

(57) ABSTRACT

An image compensation apparatus for use with a video display and a video camera, the video camera being arranged to capture images of a scene in front of the video display. The image compensation apparatus includes an analyzer configured to analyze successive frames of data provided to the video display, the successive frames of data being for displaying respective successive display images, a processor configured to calculate the illumination effect of the successive display images on the scene in front of the video displays and a compensator configured to apply image compensation to the successive images captured by the video camera so as to compensate for the effect of illumination by the video display of the scene in front of the video display.

12 Claims, 4 Drawing Sheets

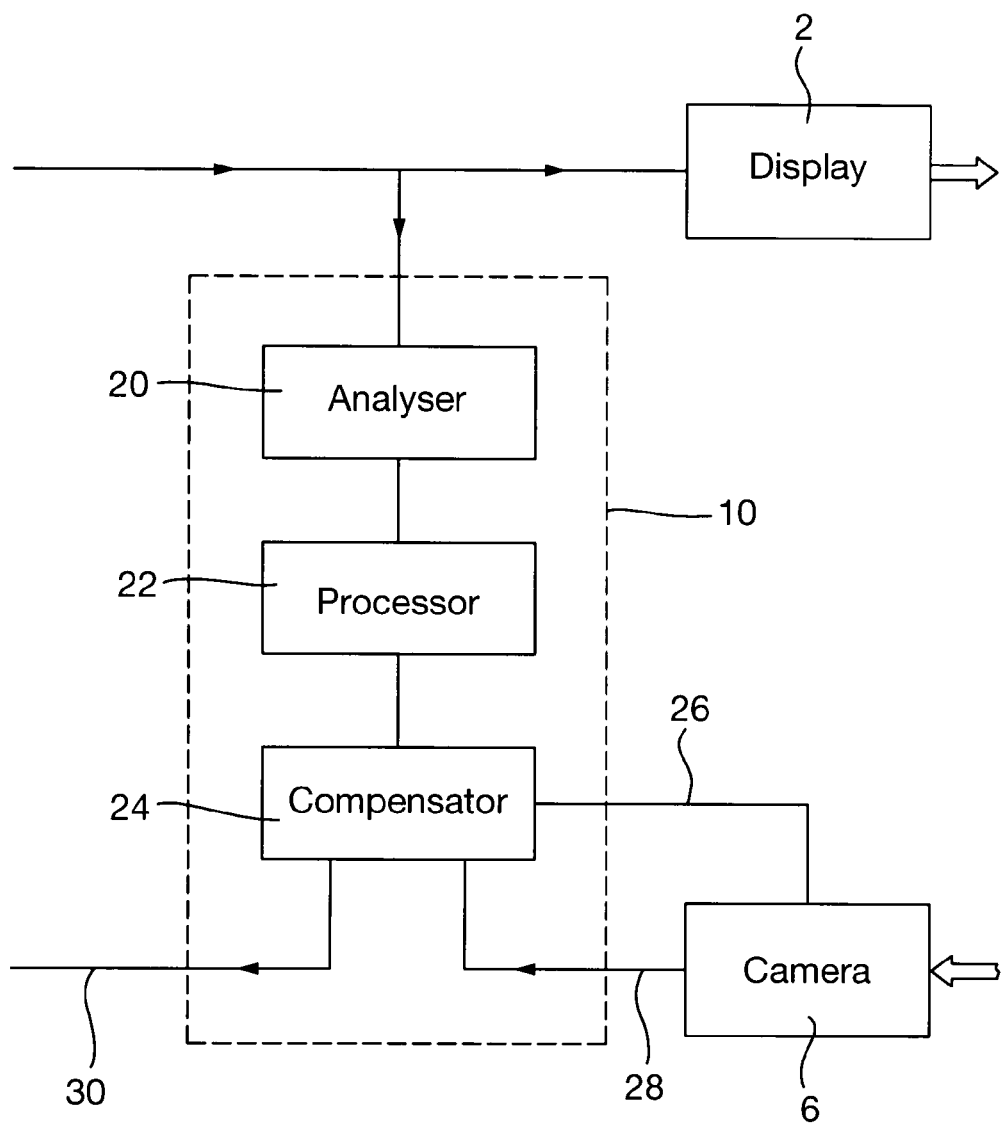

IMAGE COMPENSATION APPARATUS

CROSS-REFERENCE TO RELATED APPLICATIONS

This application is based upon and claims the benefit of priority from British Application No. 0900867.3 filed 19 Jan. 2009, the entire contents of which are incorporated by reference.

BACKGROUND OF THE INVENTION

1. Field of the Invention

The present invention relates to an image compensation apparatus and also a method of image compensation for images captured by a video camera of a system including a video display and the video camera.

2. Description of the Related Art

It is well known to provide video conferencing equipment in which a video camera is provided alongside a video display so as to capture images of the scene in front of the video display. With such a device, it is possible for a user to watch a video image displayed on the video display whilst a video image of that user is being captured by the camera for transmission to another remote user. The display may reproduce a video image of that other remote user.

US 2007/0120879 proposes an arrangement where the video camera is disposed behind the video display and captures an image of the scene in front of the video display by means of light transmitted through the display. The display includes a back light for providing illumination of each successive image. In order to prevent interference between the displayed image and that to be captured by the camera, the camera is arranged to capture images only between successive displayed images when the back light is turned off (or at least obscured). Nevertheless, because the camera must capture images through pixels of the video display, this document proposes applying image correction to the image captured by the camera according to the (non-illuminated) pixels appearing in front of the camera input sensor/lens.

OBJECTS AND SUMMARY OF THE INVENTION

The present application recognises for the first time a somewhat different problem, namely that the image produced by a display will necessarily illuminate the scene in front of the display and therefore have an effect on the image being captured by a camera, even if this camera is located in a more conventional manner alongside the display surface of the display. This illumination may effect detrimentally the colour balance and/or brightness of the captured image.

It is well known to provide white balance adjustment for cameras and, indeed, to adjust for ambient brightness. However, such systems require prior setting of an appropriate colour balance and/or adjustment of brightness/colour balance on the basis of analysis of the scene and, hence, some form of feedback control. Such systems are not effective in compensating for the fast changing brightness and colours resulting from illumination by a video display.

According to the present invention, there is provided a method of image compensation for images captured by a video camera of a system including a video display and the video camera, the video camera capturing images of a scene in front of the display. The method includes analysing successive frames of data provided to the video display, the successive frames of data being for displaying respective successive display images, calculating the illumination effect of the successive display images on the scene in front of the video display, and applying image compensation to the successive images captured by the video camera so as to compensate for the effect of illumination by the video display of the scene in front of the video display.

According to the present invention, there is also provided an image compensation apparatus for use with a video display and a video camera, the video camera being arranged to capture images of a scene in front of the video display. The image compensation apparatus includes an analyser configured to analyse successive frames of data provided to the video display, the successive frames of data being for displaying respective successive display images, a processor configured to calculate the illumination effect of the successive display images on the scene in front of the video display, and a compensator configured to apply image compensation to the successive images captured by the video camera so as to compensate for the effect of illumination by the video display of the scene in front of the video display.

In this way, it is possible to compensate a video image captured by a video camera actively as a result of knowledge of the data being provided to the video display. It is no longer necessary for a captured image to be analysed and appropriate changes in brightness and colour compensation estimated. It is possible to use the data to be provided to the video display and to calculate in advance what the effect of illumination will be. Hence, steps can be taken to compensate the image in advance of capture of that image.

The compensator may be configured to receive image data from the video camera as input data. It may then apply image compensation by adjusting values of the input data before then outputting adjusted data for use in place of the image data.

In this way, the compensator processes the raw image data after capture so as to take account of the illumination of the scene at the time when the image was captured.

It is possible additionally or alternatively for the compensator to control the video camera to adjust image capture parameters so as to achieve image compensation.

The video camera will have various capture parameters, such as shutter speed, shutter timing, bias voltages, etc. Because it is possible to calculate in advance the effect of illumination by the video display, the capture parameters of the video camera can be controlled accordingly in advance such that the image is captured correctly.

It will be appreciated that the illumination effect is the effect of light from the display images displayed on the video display being reflected off the scene in front of the video display.

The compensator may be configured to apply image compensation for compensating for changes in white balance in the successive images captured by the video camera.

In this way, if the video display illuminates the scene in front of the video display with a particular colour, the illumination effect of that colour can be compensated such that the resulting captured image appears to have correct white balance.

Alternatively or additionally, the compensator can be configured to apply image compensation for compensating for changes in brightness in the successive images captured by the video camera.

Thus, if the video display changes to displaying particularly bright or particularly dark images, it is possible to compensate for this illumination effect such that successive captured images appear to have a relatively constant brightness.

The analyser may be configured to calculate average display data for the entirety of each successive display image. The processor can be configured to calculate the corresponding illumination effect of each display image on the basis of the respective display data.

In this way, the analyser can calculate an average brightness and/or an average colour for a particular display image. Using this average, the processor can calculate the illumination effect on the scene in front of the display device.

It is also possible to average portions of the display image and to apply these averages selectively to different portions of the captured image.

The compensator may be configured to apply image compensation to each respective one of the successive images captured by the video camera according to the corresponding one or more respective display images displayed by the video display during respective period of image capture.

Where more than one display image is displayed during the period of image capture, the average for the display image (or the respective averages for different portions of the display image) can be averaged between successive images according to the proportion of time during the period of image capture in which they had an illumination effect on the scene in front of the video display.

Preferably, the video display has a display surface for displaying the display images and the video camera is provided integrally with the video display alongside the display surface.

In this respect, the video camera and video display may be provided integrally as part of a video display apparatus.

Indeed, a video display apparatus can be provided including a video display, a video camera and an image compensation apparatus as described above.

The functions of image compensation may also be provided in software, for instance to be installed on an appropriate video display apparatus having a video display and video camera.

BRIEF DESCRIPTION OF THE DRAWINGS

FIG. 3 illustrates schematically functional component parts of an image compensation apparatus embodying the present invention.

DETAILED DESCRIPTION OF THE PREFERRED EMBODIMENTS

The invention will be more clearly understood from the following description given by way of example only with reference to the accompanying drawings.

In order to improve and increase the functionality of a video display device, it is desirable to place a video camera alongside the video display.

Figure 1:
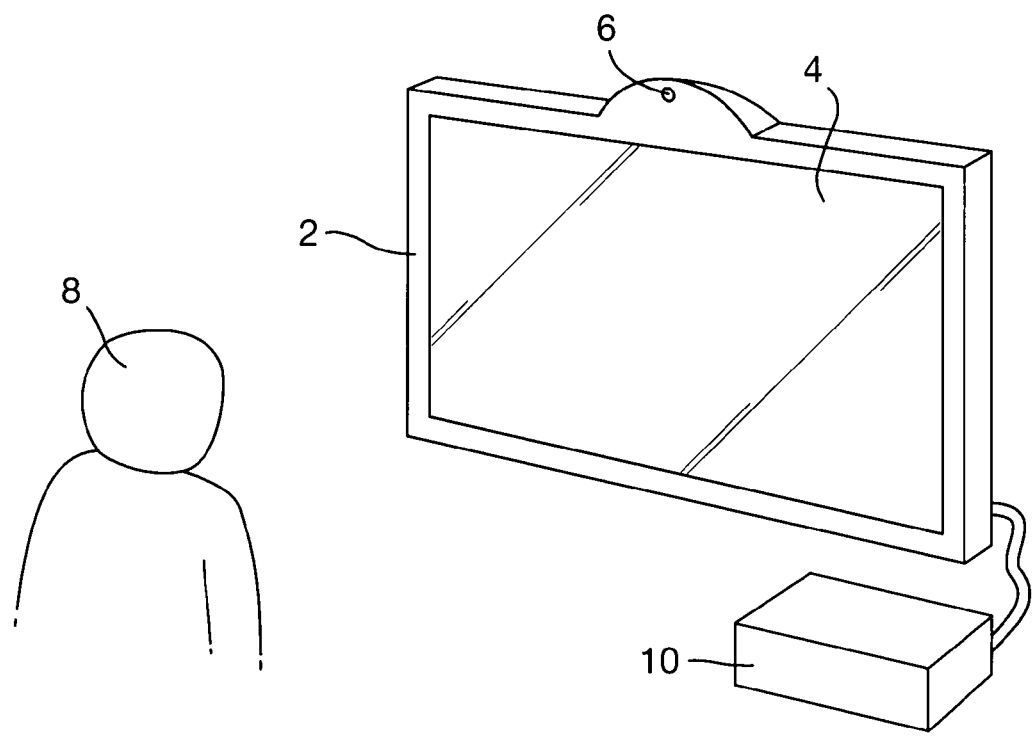
FIG. 1 illustrates schematically a video system using an image compensation apparatus according to the present invention.

FIG. 1 illustrates schematically a system having a video display 2 with a display surface 4 on which video display images may be displayed. Alongside the display surface 4, there is provided a video camera 6 which faces in the same direction as the display surface 4 so as to capture images of the scene in front of the video display 2. As illustrated, the scene in front of the video display 2 includes a viewer 8 or user of the system.

In the context of the present invention, the video display should be able to display a stream of successive images, for instance in the form of frames or fields. However, those images need not only produce video in a narrow sense but also any other moving graphical or animated images. Indeed, at times, the video display may be used to display still, graphic and/or text images, for instance as appearing in presentation slides, as well as still pictures.

As will be appreciated from the above, the display surface 4 of the video display 2 can be used to display a variety of different images. Whilst those images are being watched by a viewer 8, the video camera 6 can be used to capture images of the scene in front of the video display 2 and those images can be recorded or transmitted to another video display apparatus remote from the video display 2 and viewer 8 illustrated in FIG. 1. It is envisaged that the video display 2 will actually be used to receive, from a remote video display apparatus, captured images of the scene in front of that remote video display apparatus. In a simple video communication arrangement, the video display 2 would merely display on its display surface 4 the captured images received from the remote video display apparatus.

It is possible that both the user of the video display 2 and the remote user will wish to view the same images whilst conducting video communication with each other. Those images might be part of a presentation, a collection of pictures, a television programme or any other appropriate images.

Figure 2A:
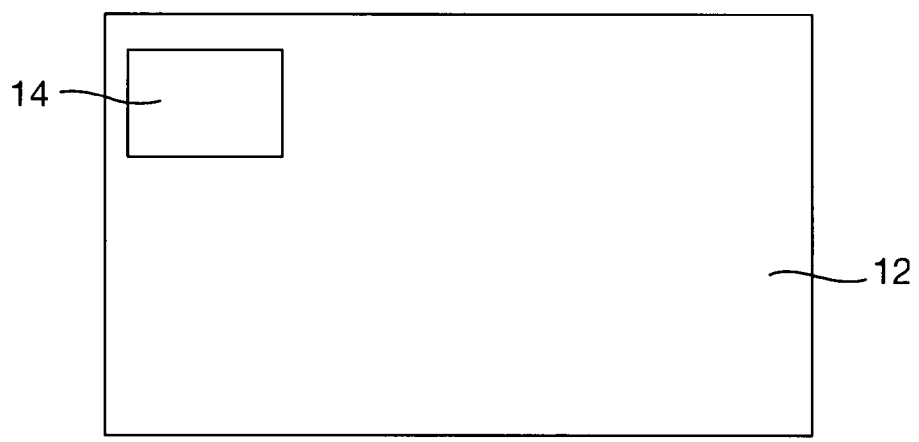
FIGS. 2(A), (B) and (C) illustrate examples of display images for use with the present invention.

FIG. 2(A) illustrates an arrangement in which the display surface 4 is divided into a main image 12 and an additional image 14. The captured images of the scene in front of the remote video display arrangement could be displayed in the additional image 14 whilst the images viewed in common could be displayed in the main image 12. However, of course, this could be reversed.

Figure 2B:
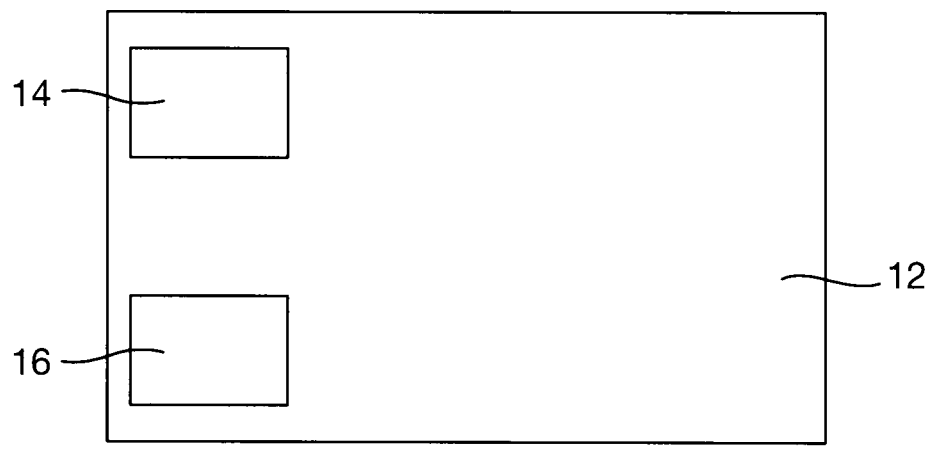

As illustrated in FIG. 2(B), it is also possible to add further additional images, such as the second additional image 16 illustrated. In this way, when communicating with a plurality of remote users, captured images from each of those plurality of users can be displayed in respective additional images 14, 16. Alternatively, other different images could be displayed in further additional images, for instance the user could choose to watch a broadcast sports programme in the additional image 16 at the same time as viewing captured images of the remote user in additional image 14 and also viewing a presentation in main image 12.

Figure 2C:
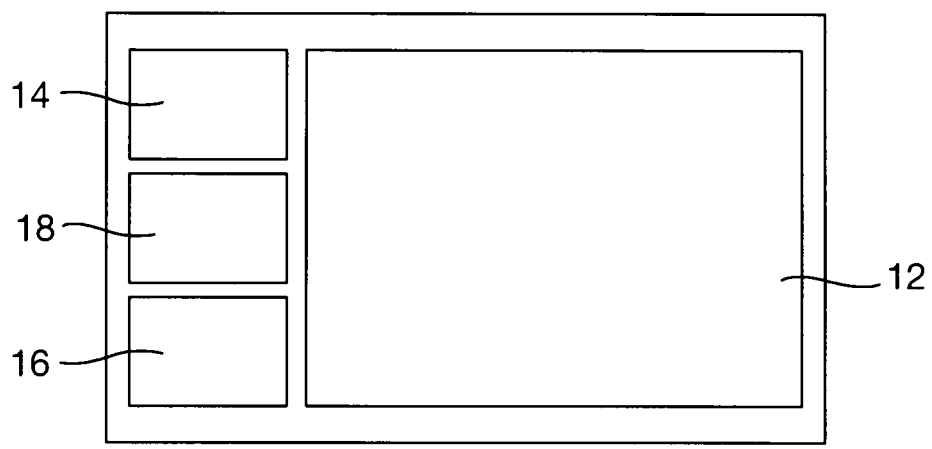

FIG. 2(C) illustrates a further variation in which a third additional image 18 has been included. It will be appreciated that, subject to the overall size of the display surface 4, any number of additional images could be provided. In the embodiment illustrated in FIG. 2(C), the main image 12 is actually provided as a separate image to the additional images 14, 16, 18. Thus, it is possible, not only to provide the additional images by way of picture-in-picture arrangements in the main image 12, but also to provide the main image as a separate area of the display surface 4.

The image displayed on the display surface 4 of the video display 2 will necessarily produce light which illuminates the scene in front of the video display 2, for instance the user 8. Although it is possible for control circuitry of the video camera 6 to correct for variations in ambient colour temperature and brightness (for instance using feedback control loops), it is very difficult to correct for the influence of illumination by any images on the video display 2. In particular, the images on the video display 2 can change very rapidly, both in colour content and brightness.

In the embodiment illustrated in FIG. 1, an image compensation apparatus 10 is illustrated for connection to the video display 2 and video camera 6. However, it will be appreciated that the image compensation apparatus 10 can be incorporated within an integral system including the video display 2 and video camera 6, for instance in a mobile telephone, laptop, notebook or television.

FIG. 3 illustrates schematically functional component parts of the image compensation apparatus 10 for use with a video display 2 and video camera 6.

The image compensation apparatus 10 includes an analyser 20 which is connected so as to receive frames of data representative of respective successive display images. In this sense, the term "frame" is used broadly so as to cover both fields and frames. The data can be taken at any stage prior to final display by the video display 2 and, hence, can range from transport stream (for instance of MPEG 2 standard and such like), or be raw data for driving directly a display, such as a liquid crystal display. Irrespective, that data contains information regarding the colour and brightness of the successive images to be displayed by the display 2 and hence the light which will emanate from the video display 2 and illuminate any scene in front of it.

Depending on the type of data received, the analyser 20 analyses the data appropriately so as to determine brightness and colour qualities of the successive images.

A processor 22 is then arranged to work with the analysis of the analyser 20 so as to calculate what the effect will be on the scene in front of the video display as a result of illumination by the successive display images.

In a preferred embodiment, for each frame or each successive image, the analyser 20 and processor 22 determine the average brightness and average colour temperature of the image and calculate the effect that this will have on the illuminated scene. Of course, in some embodiments, it will be necessary only to calculate and compensate for changes in brightness or alternatively changes in colour.

A compensator 24 is provided for applying image compensation to successive images captured by the video camera 6. The amount or nature of this compensation is determined according to the calculated illumination effect determined by the processor 22.

As is well known, the nature of image capture by a video camera can be altered by changing the various parameters used by the camera, for instance changing the diaphragm opening, physical or electronic shutter speeds and various bias voltages. Indeed, in some arrangements, it is possible to change one or more of these properties independently for different colours (for instance red, green and blue) as captured by the video camera.

With this in mind, it is proposed that, in one embodiment, the compensator 24 is able to provide a control signal 26 to the camera 6 so as to control one or more of the various parameters. As a result, without the need to calculate or sense any changes in the illumination of the scene in front of the video display 2, the compensator is able to control directly (and without any need for feedback) parameters of the camera 6 itself in real time so as to compensate for variations in illumination of the scene in front of the video display 2 as a result of images being displayed on the video display 2.

It is also or alternatively possible for the compensator 24 to apply image compensation by adjusting values of image data output by the video camera 6. Thus, as illustrated, image data from the video camera 6 resulting from image capture is received by the compensator 24 as input data 28 for image compensation.

The values of the input data 28 are adjusted according to the calculated illumination effect from the processor 22 so as to compensate in brightness and/or colour for the effect of illumination of the scene in front of the video display 2 as a result of the image displayed on the video display 2. The adjusted data is provided as output data 30 in place of the data 28 provided originally by the camera 6. In this way, again, it is possible to correct, adjust or compensate the successive images captured by the video camera without any need for sensing the actual illumination of the scene in front of the video display 2 as a result of images on the video display 2. There is no need for any feedback in this regard. The image compensation apparatus provides appropriate compensation directly as a result of analysing the image data provided to the video display 2.

With the arrangement as described, the scene, including the user 8, in front of the video display 2 is illuminated by an image displayed on the video display 2 during the successive periods in which the video camera 6 captures respective successive images. It may be that the frame rate for successive images for the video camera 6 is faster or slower than the frame rate of successive video display images displayed on the video display 2. Irrespective, the image compensation apparatus is able to provide appropriate compensation according to what is displayed by the video display 2 during the period of capture of a respective image captured by the video camera 6. If more than one display image is displayed on the video display 2 during a single period of capture, then the analyser 20 and processor 22 can calculate an appropriate compensation for the combined effect of successive illumination by those different images.

In a preferred embodiment, the processor 22 calculates the illumination effect of a display image by averaging values for that entire display image, for instance calculating an average brightness for the entire display image and/or calculating an average colour temperature of the entire display image. However, it would also be possible to adjust compensation of the images captured by the video camera 6 differently for different portions of the image. In this respect, it might be expected for a left side of a captured image to be more greatly influenced by the left side of a displayed image than the right side of the displayed imaged. Similarly, there may be differentiation between top and bottom portions of the displayed image.

Figure 4:
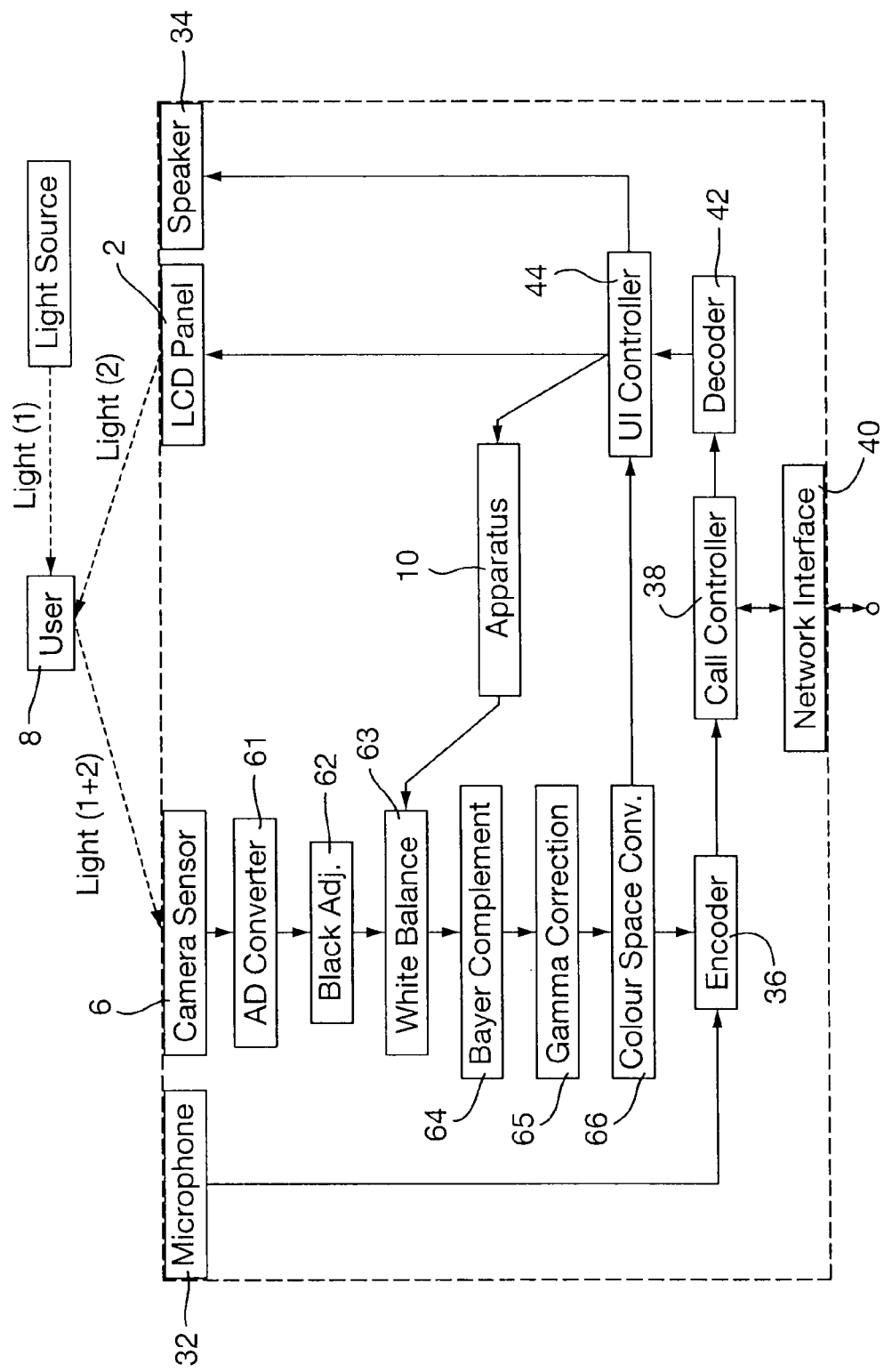
FIG. 4 illustrates an alternative apparatus embodying the image compensation apparatus of the present invention.

By way of example, FIG. 4 illustrates in more detail another video display apparatus embodying the present invention. The display apparatus is shown not only with a video display 2 in the form of an LCD panel and a camera 6 in the form of a camera sensor, but also with a microphone 32 and a speaker 34. As part of internal video processing, a number of other standard functional components are provided for processing the image data captured by the camera sensor 6. In particular, there is provided an A/D converter 61, a black adjuster 62, a white balance adjuster 63, a bayer complement 64, a gamma correction 65 and a colour space converter 66. The output of these functional units can be provided to an encoder 36 along with the output of the microphone 32.

A call controller 38 works in conjunction with a network interface 40 allowing a user to communicate with another user on a remote device as described above. The encoded audio and video information is transmitted via the network interface for reproduction by the remote user. Similarly, audio and video information received from a remote user can be passed to a decoder 42 for reproduction by the LCD panel 2 and speaker 34.

A user interface controller 44 is also provided.

As described with reference to FIG. 3, image data to be provided to the LCD panel 2 is also provided to the image compensation apparatus 10 which, as illustrated, can be used to provide image compensation with the white balance unit 63.

I claim:

1. An image compensation apparatus for use with a video display and a video camera, the video camera configured to capture images of a scene in front of the video display, the image compensation apparatus comprising:
    an analyzer configured to analyze successive frames of data provided to the video display, the successive frames of data displaying respective successive display images;
    a processor configured to calculate an illumination effect of the successive display images on the scene in front of the video display; and
    a compensator configured to apply image compensation to the successive images captured by the video camera by controlling image capture parameters of the video camera to compensate for the effect of illumination by the video display of the scene in front of the video display.

2. The image compensation apparatus according to claim 1, wherein the compensator is configured to receive image data from the video camera as input data, to apply image compensation by adjusting values of the input data and to output adjusted data for use in place of the image data.

3. The image compensation apparatus according to claim 1, wherein the compensator is configured to control at least one of a shutter speed, a diaphragm opening and bias voltages of the camera to achieve image compensation.

4. The image compensation apparatus according to claim 1, wherein the illumination effect is the effect of light from the display images displayed on the video display being reflected off the scene in front of the video display.

5. The image compensation apparatus according to claim 1, wherein the compensator is configured to apply image compensation for compensating for changes in white balance in the successive images captured by the video camera.

6. The image compensation apparatus according to claim 1, wherein the compensator is configured to apply image compensation for compensating for changes in brightness in the successive images captured by the video camera.

7. The image compensation apparatus according to claim 1, wherein the analyzer is configured to calculate average display data for the entirety of each successive display image and the processor is configured to calculate the corresponding illumination effect of each display image on the basis of the respective display data.

8. The image compensation apparatus according to claim 1, wherein the compensator is configured to apply image compensation to each respective one of the successive images captured by the video camera according to the corresponding one or more respective display images displayed by the video display during the respective period of image capture.

9. The image compensation apparatus according to claim 1, wherein the video display has a display surface for displaying the video images and the video camera is provided integrally with the video display alongside the display surface.

10. A video display apparatus comprising:
    a video display;
    a video camera; and
    an image compensation apparatus for use with the video display and the video camera, the video camera configured to capture images of a scene in front of the video display, the image compensation apparatus including
    an analyzer configured to analyze successive frames of data provided to the video display, the successive frames of data displaying respective successive display images;
    a processor configured to calculate an illumination effect of the successive display images on the scene in front of the video display; and
    a compensator configured to apply image compensation to the successive images captured by the video camera by controlling image capture parameters of the video camera to compensate for the effect of illumination by the video display of the scene in front of the video display.

11. A method of image compensation for images captured by a video camera of a system including a video display and the video camera, the video camera capturing images of a scene in front of the display, the method comprising:
    analyzing successive frames of data provided to the video display, the successive frames of data displaying respective successive display images;
    calculating an illumination effect of the successive display images on the scene in front of the video display; and
    applying image compensation to the successive images captured by the video camera by controlling image capture parameters of the video camera to compensate for the effect of illumination by the video display of the scene in front of the video display.

12. A non-transitory computer readable medium having stored thereon a program that when executed by a computer causes the computer to execute an image compensation method comprising:
    analyzing successive frames of data provided to the video display, the successive frames of data displaying respective successive display images;
    calculating an illumination effect of the successive display images on the scene in front of the video display; and
    applying image compensation to the successive images captured by the video camera by controlling image capture parameters of the video camera to compensate for the effect of illumination by the video display of the scene in front of the video display.

* * * * *